(12) United States Patent
Yen et al.

(10) Patent No.: US 6,839,450 B2
(45) Date of Patent: Jan. 4, 2005

(54) DETECTING HALFTONE MODULATIONS EMBEDDED IN AN IMAGE

(75) Inventors: Jonathan Yen, San Jose, CA (US); Daniel Tretter, Palo Alto, CA (US); Ron Kimmel, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 714 days.

(21) Appl. No.: 09/844,324

(22) Filed: Apr. 26, 2001

(65) Prior Publication Data

US 2002/0180995 A1 Dec. 5, 2002

(51) Int. Cl.[7] .............................................. H04K 1/00
(52) U.S. Cl. ...................................... 382/100; 358/3.28
(58) Field of Search ................................ 382/100, 232, 382/260, 270, 279; 358/3.08, 3.09, 3.13, 3.28; 713/176; 380/210, 252, 287, 54

(56) References Cited

U.S. PATENT DOCUMENTS

| | | | |
|---|---|---|---|
| 5,339,170 A | 8/1994 | Fan | 358/456 |
| 5,790,703 A | 8/1998 | Wang | 382/212 |
| 5,799,112 A | 8/1998 | de Queiroz et al. | 382/254 |
| 5,812,744 A | 9/1998 | Allebach et al. | 395/109 |
| 5,818,032 A | 10/1998 | Sun et al. | 235/494 |
| 5,818,970 A | 10/1998 | Ishikawa et al. | 382/248 |
| 5,912,745 A | 6/1999 | Ulichney | 358/457 |
| 6,088,123 A * | 7/2000 | Adler et al. | 358/1.9 |
| 6,141,441 A | 10/2000 | Cass et al. | 382/166 |
| 6,141,450 A | 10/2000 | Chen et al. | 382/237 |
| 6,172,773 B1 | 1/2001 | Ulichney | 358/457 |

FOREIGN PATENT DOCUMENTS

| | | | | |
|---|---|---|---|---|
| EP | 0951175 A2 | 10/1999 | | H04N/1/32 |
| EP | 10946602 A2 | 4/2001 | | H04N/1/32 |

OTHER PUBLICATIONS

Tanaka et al., "Embedding Attribute Information into a Dithered Image," *Systems and Computers in Japan*, vol. 21, No. 7, 1990, pp. 43–50.*

Baharav et al., "Watermarking of dither halftoned images," *Proc. SPIE vol. 3657: Security and Watermarking of Multimedia Contents*, Jan. 1999, pp. 307–316.*

Baharav et al., "Watermarking of Dither Halftoned Images," Hewlett Packard technical report No. HPL–98–32, May 1999, 15 pages.*

Chen et al., "Provably robust digital watermarking," *Proc. SPIE vol. 3845: Multimedia Systems and Applications II*, Sep. 1999, pp. 43–54.*

Hel–Or, "Copyright Labeling of Printed Images," *Proc. Int. Conf. on Image Processing*, vol. III, Sep. 2000, pp. 702–705.*

Antognini et al., "A Flexibly Configurable 2D Bar Code," pp. 1–36 (before Apr. 25, 2000) (http://www.paperdisk.com/ibippa–pr.htm).

Yasuhiro Nakamura et al: "A Unified Coding Method of Dithered Image and Text Data Using Micropatterns" Part I—Commuinications, Scripta Technica. New York, US, vol. 72, No. 4 Part 1, Apr. 1, 1989 pp. 50–56 *whole document*.

* cited by examiner

*Primary Examiner*—Andrew W. Johns (57) ABSTRACT

Systems and methods of detecting halftone modulations that are embedded in an image are described. The halftone modulations represent an ordered sequence of digital halftone microscreens that encodes information that has been embedded in the image. In one embodiment, the embedded information is detected by applying a respective matched filter to the image for each of two or more different halftone modulations to identify the ordered sequence of halftone modulations embedded in the image. This approach provides an effective, robust and efficient scheme for detecting such halftone modulations without knowledge of the original image before halftone modulation.

31 Claims, 9 Drawing Sheets

DETECTING HALFTONE MODULATIONS EMBEDDED IN AN IMAGE

CROSS-REFERENCE TO RELATED APPLICATIONS

This application is related to U.S. application Ser. No. 09/594,235, filed Jun. 14, 2000, by Jan P. Allebach et al., which is incorporated herein by reference.

TECHNICAL FIELD

This invention relates to systems and methods of detecting halftone modulations embedded in an image.

BACKGROUND

Digital halftoning (or spatial dithering) is the method of rendering the illusion of continuous tone pictures in an arrangement of binary picture elements. In the case of rendering a continuous tone image with a digital output device, such as an ink jet printer or a laser printer, digital halftoning involves simulating the continuous tone image with groups or cells of dots.

In general halftoning involves generating a binary, or two-tone, image from a continuous tone, or contone or grayscale, image. Grayscale images are continuous tone black (or some other single color) and white images, whereas contone images may be either full color images or single-color and white images. In either case, a halftone image is generated from a contone (full color or grayscale) image using any one of a variety of halftoning techniques, including threshold arrays or dithering (e.g., clustered dots, dispersed dots and stochastic screens), adaptive processes (e.g., error diffusion), and interactive processes (e.g., least squares and direct binary search).

Many different methods for embedding information into an image also have been proposed.

For example, bar coding is a well-known category of document or image marking techniques for densely encoding digital information in a small image space without regard to how visible the encoded information is to a human viewer. A bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Data glyph technology is another category of information embedding techniques that is particularly advantageous for use in image applications that require a high density rate of embedded data and require the embedded data to be robust with respect to decoding. Data glyph technology encodes digital information in the form of binary 1's and 0's that are then rendered in the form of distinguishable shaped marks such as very small linear marks. Generally, each small mark represents a digit of binary data, and the linear orientation of the particular mark determines whether the particular digit is a digital 1 or 0.

Other document or image marking techniques have been proposed for embedding information in an image so that the information substantially is imperceptible to a human viewer (i.e., in a manner that simultaneously minimizes image distortion caused by embedding the information) while permitting reliable decoding of the information. For example, many different digital watermarking techniques have been proposed. In general, a digital watermark is designed to produce an embedded signal that is imperceptible to a human viewer so as not to diminish the commercial quality and value of the image being watermarked, while producing an embedded signal that is resistant to tampering.

In another approach, U.S. Pat. No. 6,141,441 discloses a technique for decoding message data that has been encoded into a printed color image as a series of small image regions (referred to as "signal cells") that carry the encoded message. Each signal cell is composed of a spatial pattern of colored subregions that collectively have an overall average color. The colors of the subregions are defined as changes (modulations) to the average color in one or more directions in a multi-dimensional color space. The decoding technique uses a set of valid signal blocks, each of which is a unique pattern of color modulated subregions. There is a valid signal block for each valid message value defined in the coding scheme. The decoding operation first locates the positions of the signal cells in the acquired image and then subtracts the local average color of each signal cell from the cell to produce a received signal block. The decoding operation determines the respective valid signal block corresponding to each of the received signal blocks by comparing each valid signal block to each received signal block. One implementation of the decoding technique decodes signal cells that have been arranged in the acquired image in a 2D array by synchronizing an imaginary grid-like structure with the most likely position of all of the signal cells. In one embodiment, a color space direction is selected for the color modulations that results in the differently colored subregions of a signal cell being substantially imperceptible to a human viewer, thus making the pattern that carries the message substantially imperceptible in an encoded image.

Still other information embedding schemes have been proposed.

SUMMARY

The invention features systems and methods of detecting halftone modulations that are embedded in an image. The halftone modulations represent an ordered sequence of digital halftone microscreens that encodes information embedded in the image. The invention provides an effective, robust and efficient scheme for detecting such halftone modulations without knowledge of the original image before halftone modulation.

In one aspect of the invention, information embedded in an image is detected by applying a respective filter to the image for each of two or more different halftone modulations to identify an ordered sequence of halftone modulations embedded in the image.

Embodiments of the invention may include one or more of the following features.

Each halftone modulation preferably is generated from a respective dither matrix. Each filter preferably corresponds to a matched filter for a respective halftone modulation.

In some embodiments, the step of applying a respective filter to the image comprises convolving the filter with the image. A score map preferably is generated for each halftone modulation based upon the convolution of the corresponding filter and the image. Halftone modulations embedded in regions of the image may be identified based upon the generated score maps. One halftone modulation preferably is selected as corresponding to an image region to which multiple halftone modulations are identified based upon the generated score maps. Halftone modulations may be identified in the image based upon a first threshold applied to the score maps. The threshold may be lowered in regions to which no halftone modulation has been identified based upon the first threshold. In addition, image tone may be re-mapped in image regions to which no halftone modulation has been identified based upon a lowered threshold.

The image may comprise a plurality of image levels, and filters may be applied to a single image level at a time. For example, the image may be a grayscale image comprising multiple gray levels and filters initially may be applied to a middle gray level of the image (e.g., a 50% gray level of the image). Filters may be applied to a different gray level of the image to resolve uncertainties or ambiguities, or both.

A system for detecting information embedded in an image and a computer program for detecting information embedded in an image also are described.

Other features and advantages of the invention will become apparent from the following description, including the drawings and the claims.

DESCRIPTION OF DRAWINGS

FIG. 4A is a diagrammatic representation of a dither matrix from which a set of grayscale halftone microscreens may be generated.

FIG. 4B is a diagrammatic representation of the dither matrix of FIG. 4A with the entries corresponding to a 10% gray level circled.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1A:
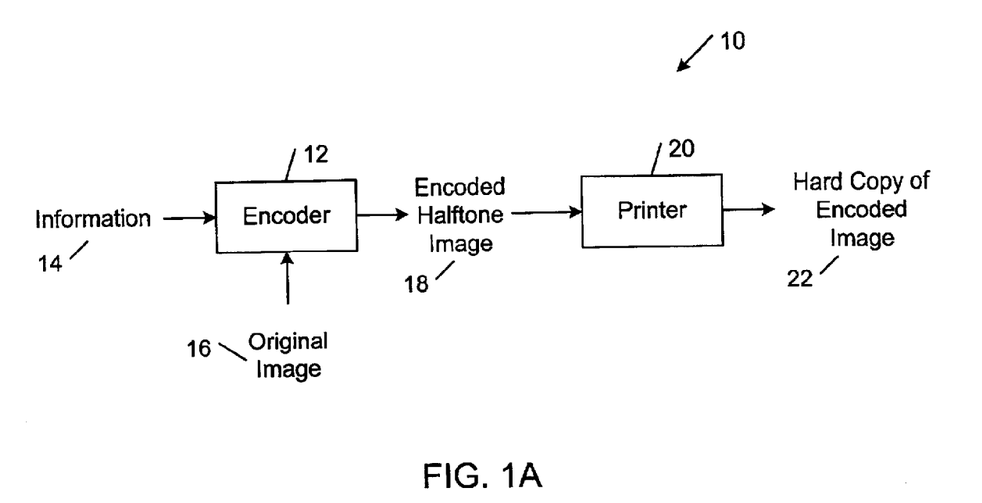
FIG. 1A is a block diagram of an encoder producing from an original image a halftone image containing information encoded as an ordered sequence of halftone microscreens and a printer producing a hard copy of the encoded halftone image.

Referring to FIG. 1A, in one embodiment, an encoding system 10 includes an encoder 12 that is configured to encode information 14 as an ordered sequence of two or more different halftone microscreens in an original image 16 to produce an encoded halftone image 18. Encoding system 10 also includes a printer 20 that is configured to produce a hard copy 22 of encoded halftone image 18. Encoder 12 may be a computer or other programmable processor, and printer 20 may be a conventional printer (e.g., a LaserJet® printer available from Hewlett-Packard Company of Palo Alto, Calif., U.S.A.). Original image 16 may be a continuous tone grayscale image or a continuous tone color image. The ordered sequence of halftone microscreens may be embedded in one or more levels (i.e., one or more gray levels or color concentration levels) of original image 16. The resulting halftone modulations in encoded halftone image 18 are substantially imperceptible to a viewer; however, the halftone modulations may be detected readily and reliably by an appropriately configured decoding system.

Figure 1B:
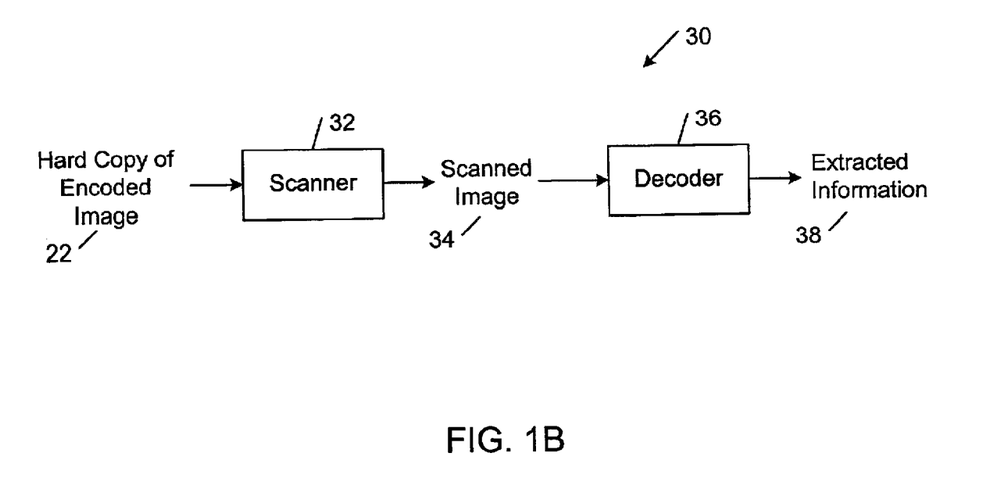
FIG. 1B is a block diagram of a scanner producing a scanned image from an encoded halftone image and a decoder extracting from the scanned image an ordered sequence of halftone microscreens embedded in the encoded halftone image.

Referring to FIG. 1B, in one embodiment, a decoding system 30 includes a scanner 32 that is configured to produce a continuous tone scanned image 34 from hard copy 22 of encoded halftone image 18 by a conventional inverse-halftoning process. Decoding system 30 also includes a decoder 36 that is configured to detect the halftone modulations encoded in hard copy 22 of halftone image 18 and, thereby, extract information 38 encoded in the detected ordered halftone modulation sequence. Scanner 32 may be a conventional desktop optical scanner (e.g., a ScanJet® scanner available from Hewlett-Packard Company of Palo Alto, Calif., U.S.A.) or a portable scanner (e.g., a CapShare® portable scanner available from Hewlett-Packard Company of Palo Alto, Calif., U.S.A.), and decoder 36 may be a computer or other programmable processor.

As described in detail below, in accordance with the above-described encoding and detection scheme, the embedded halftone modulations may be detected efficiently, effectively and robustly without knowledge of original image 16 to provide a truly viable blind information embedding and decoding approach.

Figure 2:
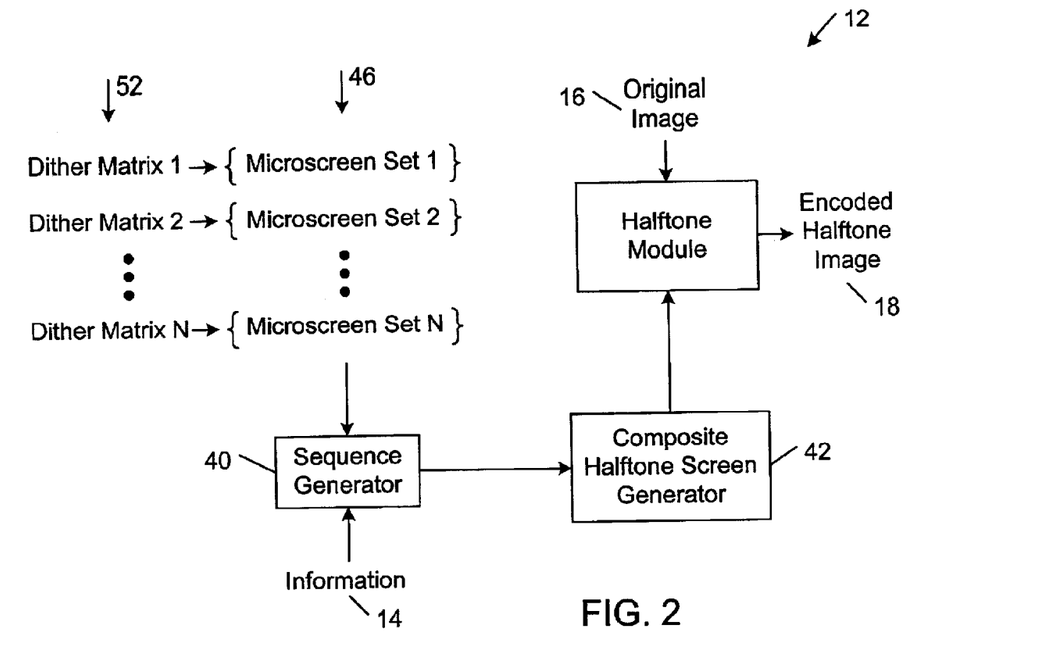
FIG. 2 is a diagrammatic representation of the encoder of FIG. 1A, including a sequence generator, a composite halftone screen generator, and a halftone module.

Referring to FIG. 2, in one embodiment, encoder 12 includes a sequence generator 40, a composite halftone screen generator 42, and a halftone module 44. Sequence generator 40 is configured to generate an ordered sequence of halftone microscreens from multiple sets of microscreens 46 based upon the information 14 to be encoded in original image 16. Composite halftone screen generator 42 is configured to generate composite (or mosaic) halftone screens 48 from the ordered sequence of halftone microscreens received from sequence generator 40. Halftone module 44 is configured to generate encoded halftone image 18 from the composite halftone screens 48 received from composite halftone screen generator 42 by a halftone screening process. As explained in detail below, each microscreen set 46 includes a microscreen for each level (1 through N) of original image 16. Accordingly, together sequence generator 40 and composite halftone screen generator 42 are configured to generate a composite halftone screen for each level of original image 16.

Referring to FIGS. 3, 4A, 4B and 4C, in operation, encoder 12 is configured to produce from original image 16, information 14 and microscreen sets 46 an encoded halftone image 18 as follows.

Figure 3:
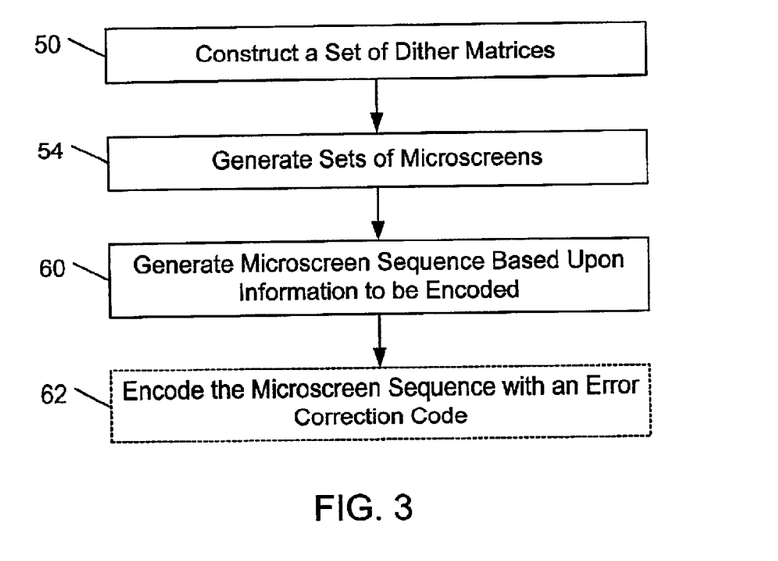
FIG. 3 is a flow diagram of a method of encoding information in a halftone image as an ordered sequence of halftone microscreens.

Initially, a set of two or more different dither matrices is constructed (step 50).

The dither matrices preferably are designed to tile together seamlessly and may be constructed as described in co-pending application Ser. No. 09/594,235, filed Jun. 14, 2000, by Jan P. Allebach et al. As shown in FIG. 4A, each dither matrix 52 includes an arrangement of histogram numbers respectively corresponding to the levels of original image 16. In this embodiment, original image 16 is assumed to be a grayscale image with 255 levels (1 through 255).

Figure 4C:
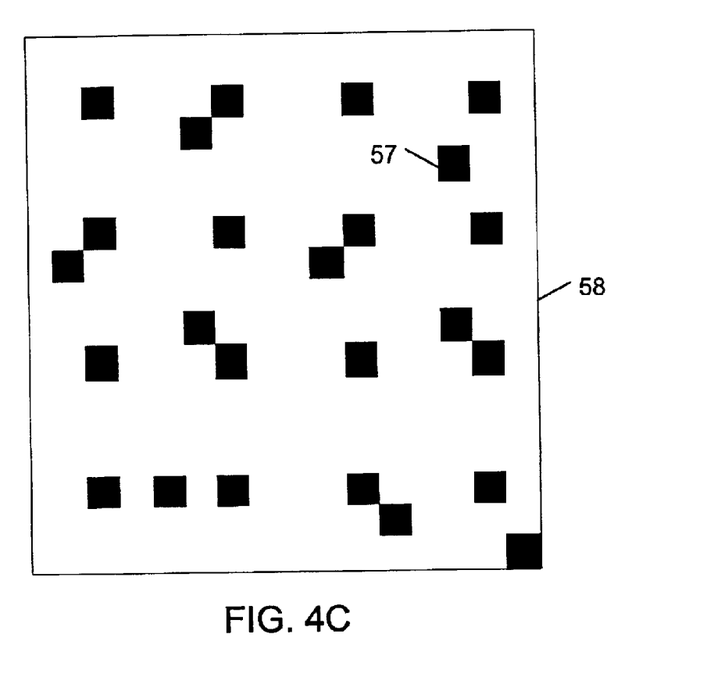
FIG. 4C is a diagrammatic representation of a halftone microscreen generated from the dither matrix of FIG. 4A for a 10% gray level.

Next, sets of microscreens 46 are generated from the dither matrices (step 54). The histogram numbers of each dither matrix 52 specify the number and arrangement of dots to add at each microscreen image level. For example, as shown in FIGS. 4B and 4C, histogram numbers greater than 230 are marked (by ovals 56) to indicate where dots 57 should be placed to produce a 10% gray level microscreen 58. Microscreens for other image levels may be generated in a similar way.

Sequence generator 40 then generates a sequence of microscreen sets 46 based on the information 14 to be encoded for each image level (step 60). Since the dither matrices from which the microscreens are generated are different, the microscreens may be tiled in an ordered microscreen sequence that encodes information 14. In general, the information 14 to be encoded includes a string of data items each indicating one of a set of valid values in a coding scheme. The data items are not restricted in any way as to the nature of the information to be conveyed and may, for example, represent character symbols in a language using ASCII or UNICODE character encoding, or the compressed or encrypted form of such symbols. The data items may indicate data in the form of "0" and "1" symbols, or may indicate a set of values that define another coding scheme.

Optionally, the microscreen sequences may be encoded with an error correction code (step 62). In some embodiments, the microscreen sequences also may incorporate other schemes (e.g., a redundancy scheme) to facilitate decoding.

Additional details regarding the process of constructing the sets of microscreens 46 may be obtained from the above-mentioned co-pending application Ser. No. 09/594,235, filed Jun. 14, 2000, by Jan P. Allebach et al.

Figure 5:
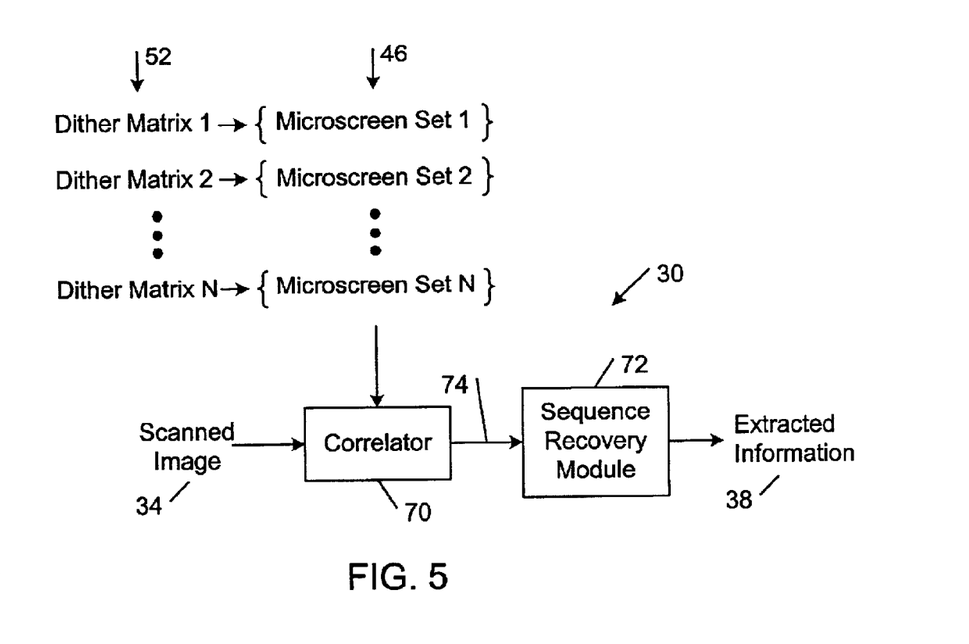
FIG. 5 is a diagrammatic representation of the decoder of FIG. 1B, including a correlator and a sequence recovery module.

Referring to FIG. 5, in one embodiment, decoder 30 includes a correlator 70 and a sequence recovery module 72. Correlator 70 is configured to correlate regions of the continuous tone scanned image 34 with a corresponding microscreen of one of the microscreen sets 46 to produce a correlation image 74 for selected image levels. Sequence recovery module 72 is configured to recover the microscreen sequence from each correlation image 74 to extract information 38.

Referring to FIGS. 6, 7, 8, 9A and 9B, in one embodiment, decoder 30 is configured to extract information 38 from scanned image 34 as follows.

Figure 7:
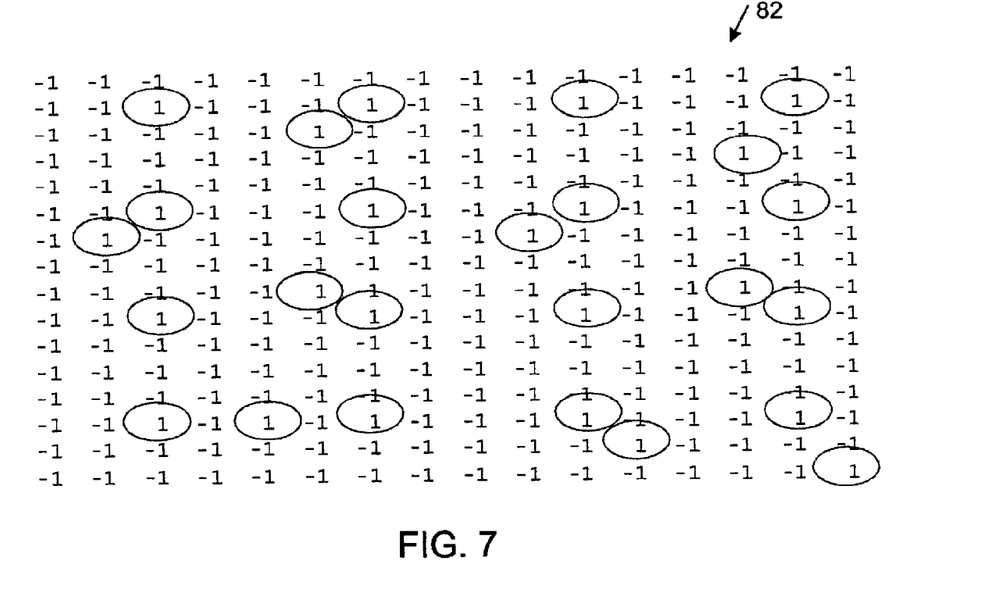
FIG. 7 is a diagrammatic representation of a matched filter for a halftone microscreen generated from the dither matrix of FIG. 4A for a 10% gray level.

Initially, correlator 70 generates one matched filter for each microscreen set 46 for a selected image level (step 80). It has been discovered that, in many cases, a substantial fraction of the microscreens may be identified in scanned image 34 using matched filters designed for an image level of 50% (e.g., a 50% gray level). As shown in FIG. 7, in this embodiment, the resulting matched filters 82 each includes a matrix of 1's at locations where dots should be placed to produce the microscreen corresponding to the selected image level, and −1's at the remaining locations. For example, the matched filter of FIG. 7 corresponds to the 10% gray level microscreen 58 of FIG. 4C, and includes 1's at the dot locations of microscreen 58 and −1's at the remaining locations.

Figure 6:
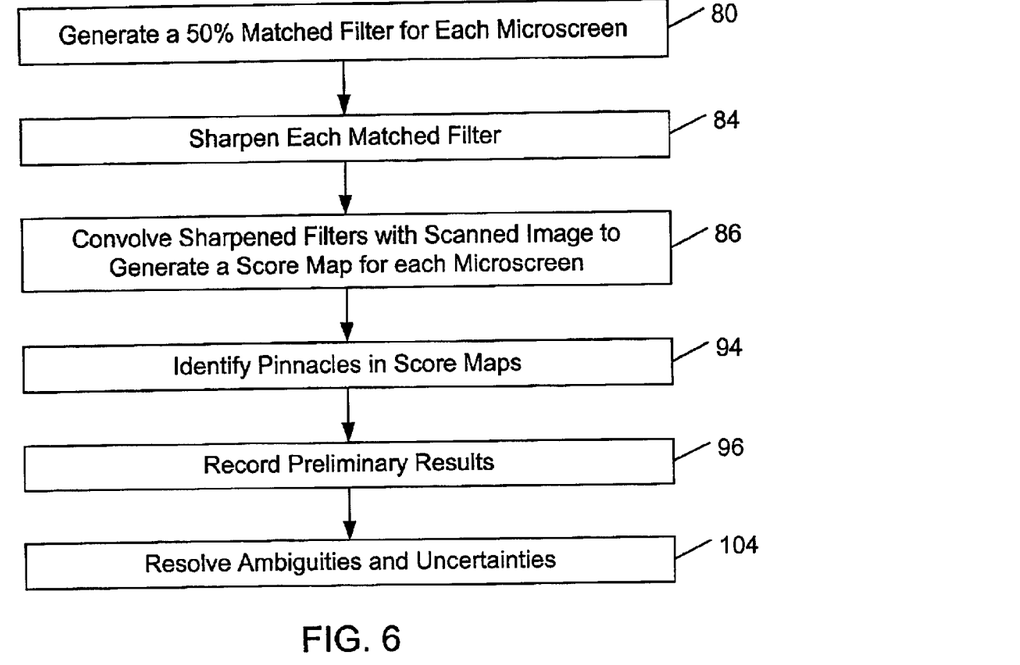
FIG. 6 is a flow diagram of a method of decoding information embedded in a halftone image as an ordered sequence of halftone microscreens.

Next, each matched filter is sharpened (step 84). The matched filters may be sharpened by a conventional sharpening filter. For example, the following sharpening filter may be applied to each matched filter to improve the ability of correlator 70 to identify microscreens in scanned image 34.

| 0  | −1 | 0  |
| -- | -- | -- |
| −1 | 4  | −1 |
| 0  | −1 | 0  |

Figure 8:
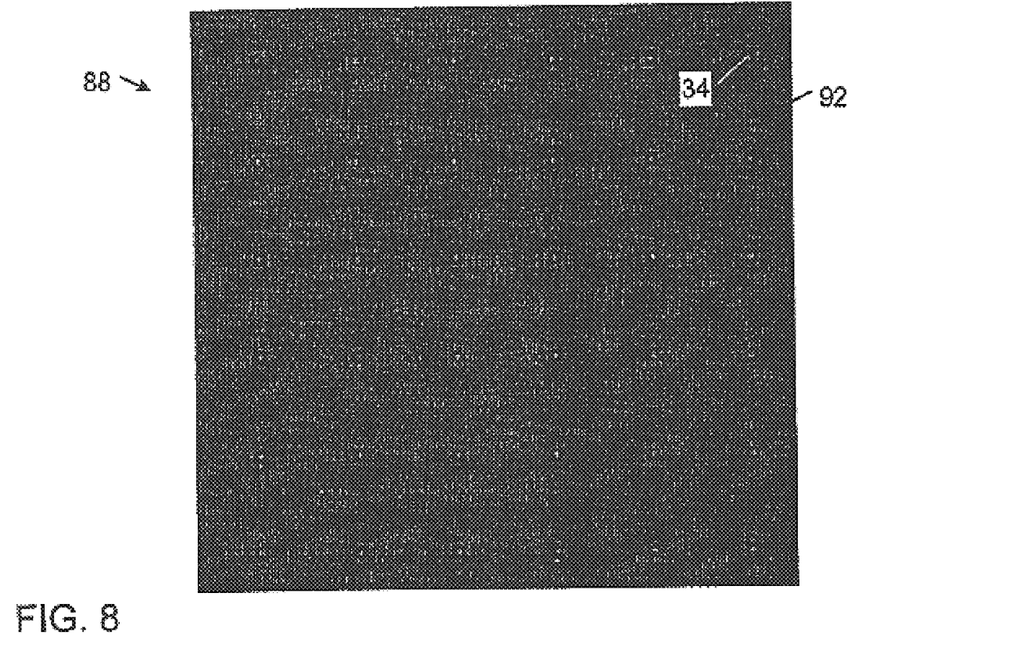
FIG. 8 is a diagrammatic representation of a score map generated by convolving a sharpened version of the matched filter of FIG. 7 with an encoded halftone image.

The resulting sharpened matched filters are convolved with scanned image 34 to generate a score map for each of the microscreens that have been generated for the selected image level (step 86). As shown in FIG. 8, each score map 88 includes clusters 90 (or pinnacles) of relatively light pixels surrounded by a relatively dark background region 92. Each pinnacle 90 in a given score map 88 corresponds to a central portion of a region of scanned image 34 where there is a strong likelihood that the corresponding microscreen has been embedded. In the embodiment of FIG. 8, pinnacles appear to be arranged in a regular array corresponding to the central portion of each tile location across scanned image 34, indicating that the same microscreen has been embedded at each tile location. In other embodiments, different microscreens may be embedded in scanned image 34, in which case pinnacles would appear in a given score map only at the locations where the corresponding microscreen has been embedded.

In some embodiments, scanned image 34 may be dewarped to remove scanner distortion before the sharpened matched filters are convolved with scanned image 34 (step 86). For example, scanner distortion may be dewarped with a mapping T: R×R→R×R from the coordinates of the true image (I) to the coordinates is of the scanned image (I') such that:

$$I(x, y)=I'(x', y')=I'(T_x(x, y), T_y(x, y))$$

The mapping may be approximated by polynomials with coefficients that are obtained by a conventional least squares approximation. For some embodiments, however, the scanner distortion is minimal and scanned image 34 need not be dewarped.

Next, the centroids of the pinnacle locations are identified in each score map (step 94). In one embodiment, pinnacle locations are identified by applying a threshold to each score map to determine the coordinates of regions likely to contain the centers of the tile locations. The coordinates of each pinnacle region are adjusted with respect to a modulus corresponding to the tile size (e.g., the coordinates would be computed based on mod 32 for tiles with dimensions of 32×32). The resulting coordinates are tallied and the coordinate with the highest count is selected as the center of periodicity for the score map being analyzed. The pinnacle regions of each score map are coalesced into the selected center of each tile location and outliers are removed.

Figure 9A:
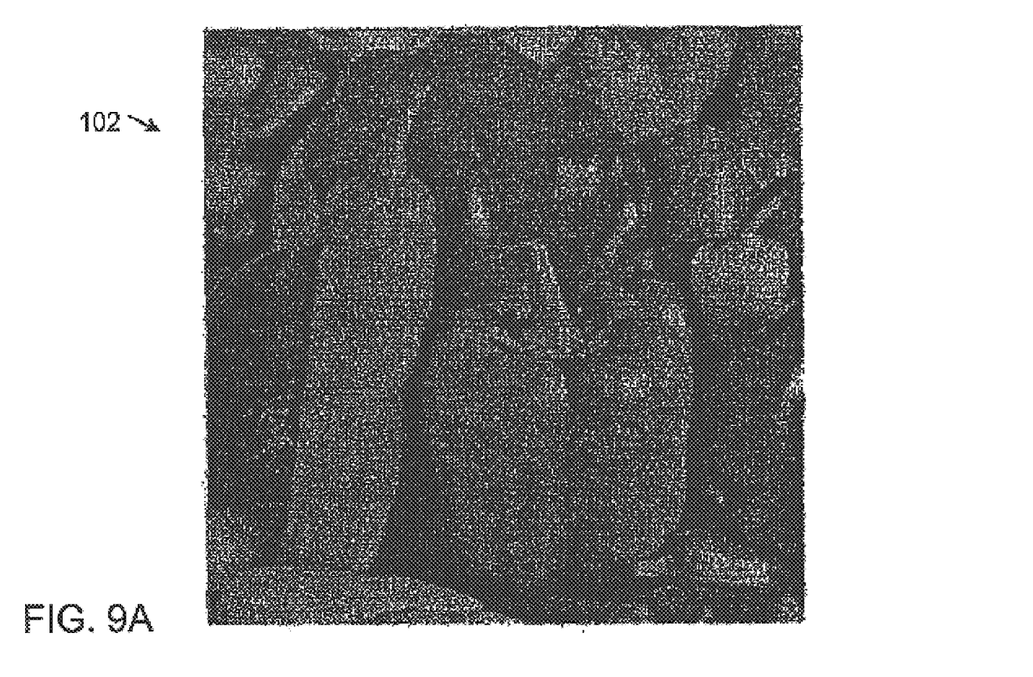
FIG. 9A is a diagrammatic representation of an encoded halftone image.
Figure 9B:
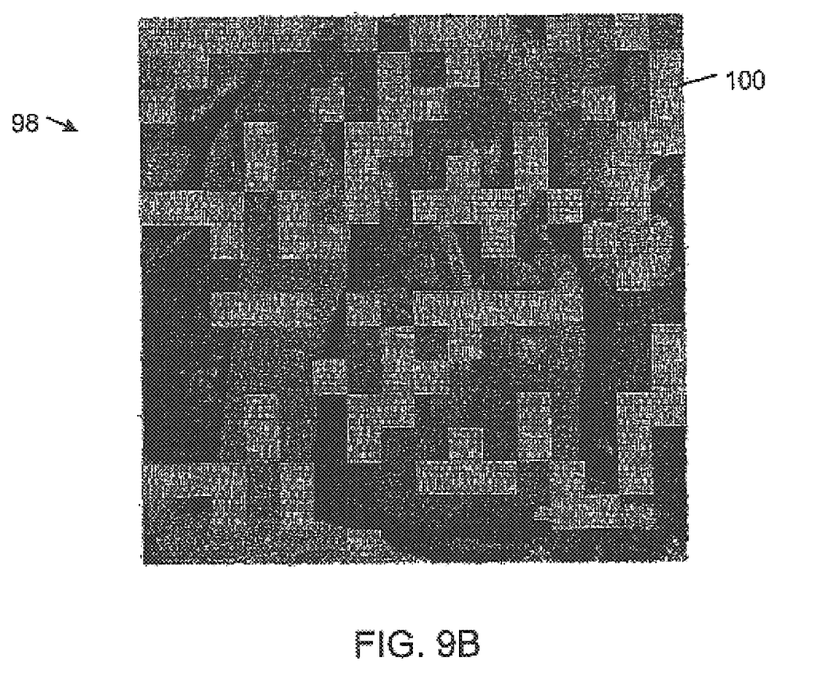
FIG. 9B is a diagrammatic representation of the encoded halftone image of FIG. 9A with regions identified as corresponding to a first embedded halftone microscreen marked by shading.

The preliminary identification results are recorded in a final score map for each microscreen (step 96). As shown in FIGS. 9A and 9B, in one embodiment, a final score map 98 for a given microscreen may consist of a series of regions 100 that are marked over a scanned image 102 corresponding to tile locations where the microscreen has been identified. The remaining, unmarked tile locations correspond to image regions where the microscreen was not found, at least in the first pass.

Next, ambiguities and uncertainties in the recorded preliminary results are resolved (step 104). Ambiguities arise when two or more microscreens are identified at the same tile location. Uncertainties arise when none of the microscreens can be identified at a particular tile location (e.g., when none of the microscreen score maps registers a hit).

Figure 10:
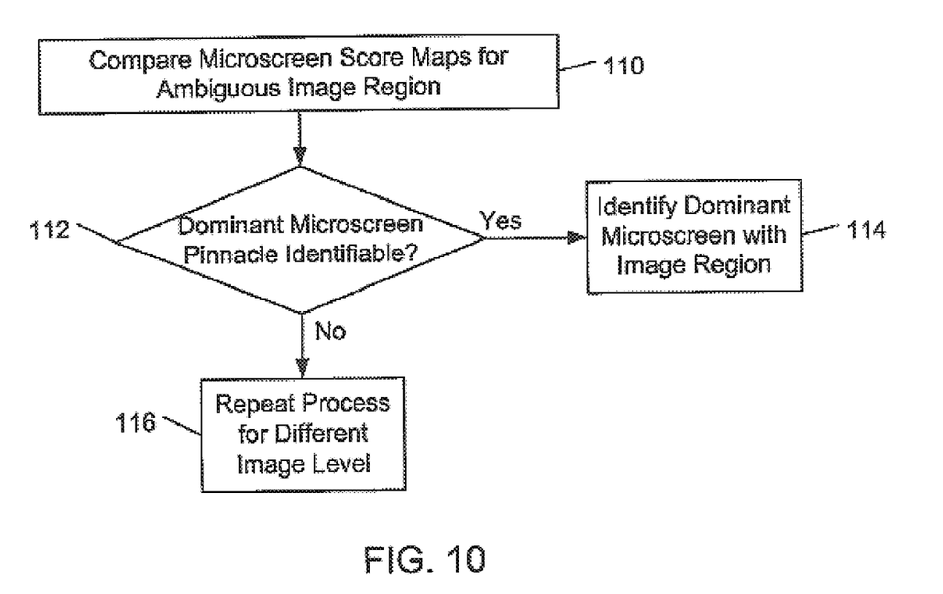
FIG. 10 is a flow diagram of a method of resolving ambiguities in the decoding method of FIG. 6.

Referring to FIG. 10, in one embodiment, ambiguities may be resolved by a probabilistic analysis as follows. Initially, the score maps for the different microscreens that have been identified at an ambiguous tile location are compared (step 110). If one of the identified microscreens has a dominant score (i.e., a higher score map pinnacle value produced by the convolution of the corresponding sharpened matched filter and the scanned image) (step 112), that microscreen is identified with the ambiguous tile location (step 114). In some embodiments, the dominant microscreen must have a score that is greater than the scores of the other identified microscreens by a selected threshold—which may be determined empirically based upon the background noise level—before being identified with the ambiguous tile location. In other embodiments, however, the dominant microscreen merely has to have a score that is marginally greater than the scores of the other identified microscreens in order to be identified with the ambiguous tile location. If there is no dominant microscreen (step 112), the process of FIG. 6 is repeated for a different image level (step 116). The selected matched filter image level may be greater than 50% if the ambiguous tile location lies within a relatively dark region of scanned image 34, or may be lower than 50% is the ambiguous tile location lies within a relatively light region of scanned image 34. For example, in one embodiment, 75% matched filters are generated for each microscreen for relatively dark ambiguous tile locations, and 25% matched filters are generated for each microscreen for relatively light ambiguous tile locations. The process of FIG. 6 may be repeated for one or more different image levels. If a dominant microscreen cannot be resolved after the process of FIG. 6 has been repeated (step 116), one of the microscreens may be selected to be identified with the ambiguous tile location and this may be recorded as a "soft" decision in the final score map. The ambiguity ultimately may be resolvable by an error correction code, redundancy or other decoding feature that has been incorporated into the information embedded in scanned image 34.

Figure 11:
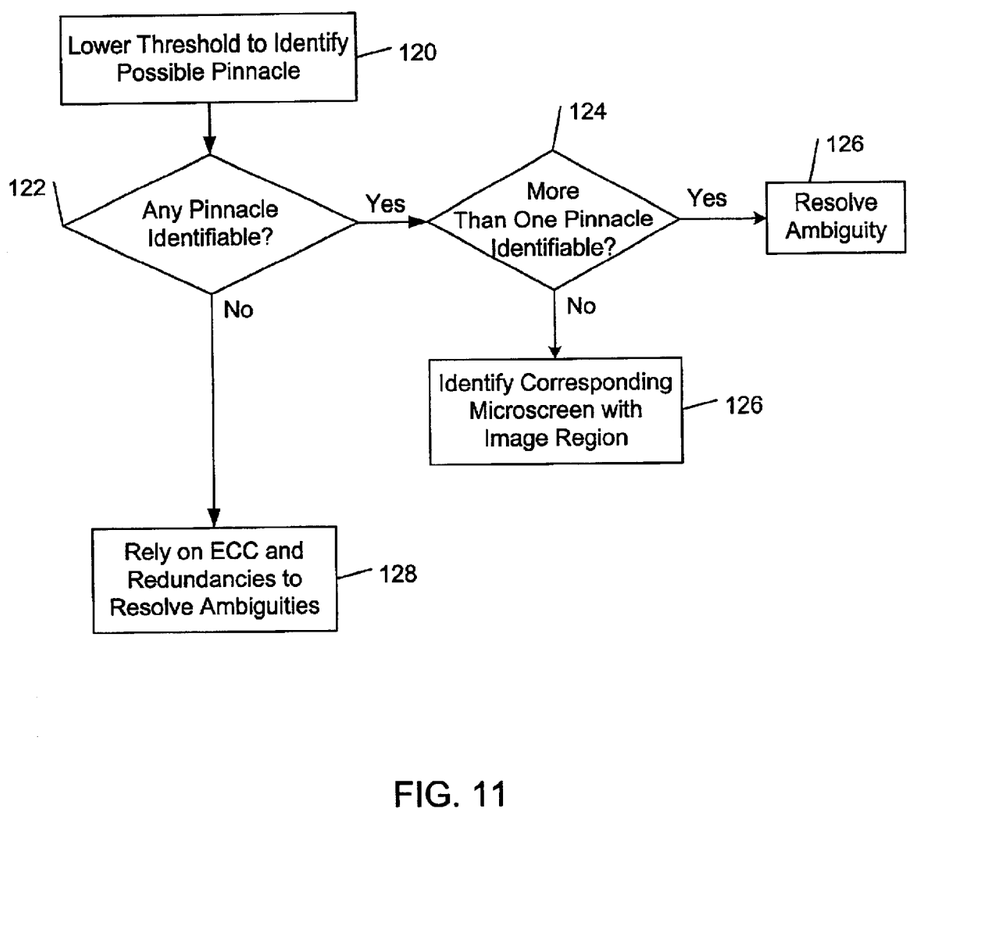
FIG. 11 is a flow diagram of a method of resolving uncertainties in the decoding method of FIG. 6.

Referring to FIG. 11, in one embodiment, uncertainties may be resolved as follows. Initially, the threshold that was applied to each of the score maps in step 94 of the process of FIG. 6 may be lowered to identify possible pinnacles at the uncertain tile locations (step 120). In general, the threshold should not be lowered below a certain level to avoid a substantial increase in false positives. If a single pinnacle is identifiable using the lowered threshold (steps 122 and 124), the corresponding microscreen is identified with the uncertain tile location (step 126). If pinnacles for more than one microscreen are identifiable using the lowered threshold (steps 122 and 124), the ambiguity may be resolved in accordance with the process of FIG. 10 (step 126). If no pinnacles are identifiable using the lowered threshold (step 122), the uncertainty may be resolvable by an error correction code, redundancy or other decoding feature that has been incorporated into the information embedded in scanned image 34 (step 128).

In some embodiments, the number of uncertainties may be reduced by re-mapping the tone of original image 16 before the halftoning process that is implemented by encoder 12 (FIG. 1A). In this way, regions of original image 16 that are either too dark or too light for embedded halftone matrices to be detected may be removed. The image tone may be re-mapped by a conventional image tone re-mapping process. In one embodiment, the image tone may be re-mapped by clamping the high and low ends of the image level spectrum to respective moderate values. For example, for a grayscale image with 255 gray levels, gray levels above 240 may be re-mapped to a gray level of 240 and gray levels below 11 may be re-mapped to a gray level of 11. In another embodiment, the image tone may be re-mapped in accordance with a selected tone curve.

Figure 12:
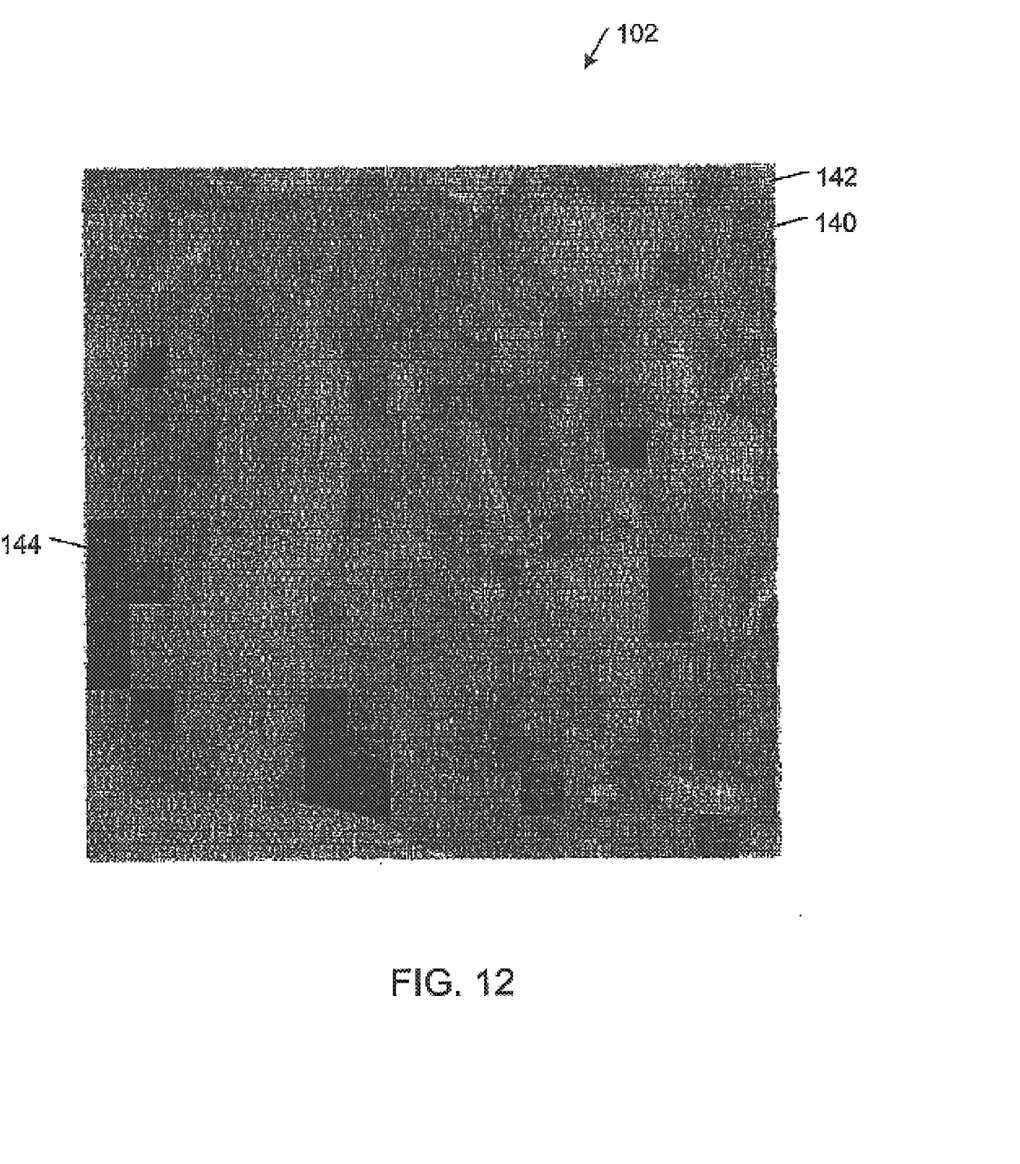
FIG. 12 is a diagrammatic representation of the encoded halftone image of FIG. 9A with regions corresponding to first and second embedded halftone microscreens marked by shading after ambiguities and uncertainties have been resolved in accordance with the methods of FIGS. 10 and 11, respectively.

Referring to FIG. 12, after ambiguities and uncertainties have been resolved in accordance with the methods of FIGS. 10 and 11, respectively, the identified microscreens may be arranged in tile locations across scanned image 102 in an ordered sequence of microscreens. In this embodiment, information 14 has been embedded in scanned image 102 as an ordered sequence of first and second halftone microscreens, which are marked by the differently shaded tile regions 140, 142, respectively. As shown, in some regions 144, no microscreen could be identified. These regions are marked as "missing" by sequence recovery module 72 (FIG. 5). As mentioned above, the information contained in missing tile regions still may be recovered by subsequent processing of an error correction code, redundancy or other feature that has been incorporated into the information embedded in scanned image 34 to facilitate decoding.

The systems and methods described herein are not limited to any particular hardware or software configuration, but rather they may be implemented in any computing or processing environment, including in digital electronic circuitry or in computer hardware, firmware or software. The encoder and decoder modules may be implemented, in part, in a computer program product tangibly embodied in a machine-readable storage device for execution by a computer processor. In some embodiments, the encoder and decoder modules preferably are implemented in a high level procedural or object oriented programming language; however, the algorithms may be implemented in assembly or machine language, if desired. In any case, the programming language may be a compiled or interpreted language. The encoding and decoding methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.

For example, although the above embodiments are described in connection with information embedded as an ordered sequence of individual microscreens, other embodiments may embed information in an image as an ordered sequence of groups (e.g., M×N arrays) of microscreens.

Still other embodiments are within the scope of the claims.

What is claimed is:

1. A method of detecting information embedded in an image, comprising:
   for each of two or more different halftone modulations, applying a respective filter to the image to identify an ordered sequence of halftone modulations embedded in the image.

2. The method of claim 1, wherein each halftone modulation is generated from a respective dither matrix.

3. The method of claim 1, wherein each filter corresponds to a matched filter for a respective halftone modulation.

4. The method of claim 1, wherein applying a respective filter to the image comprises convolving the filter with the image.

5. The method of claim 4, further comprising generating a score map for each halftone modulation based upon the convolution or the corresponding filter and the image.

6. The method of claim 5, further comprising identifying halftone modulations embedded in regions of the image based upon the generated score maps.

7. The method of claim 6, further comprising selecting one halftone modulation as corresponding to an image region to which multiple halftone modulations are identified based upon the generated score maps.

8. The method of claim 6, wherein halftone modulation are identified in the image based upon a threshold applied to the score maps.

9. The method of claim 8, further comprising lowering the threshold in regions to which no halftone modulation has been identified based upon the first threshold.

10. The method of claim 1, further comprising re-mapping image tone before halftoning.

11. The method of claim 1, wherein the image comprises a plurality of image levels, and filters are applied to a single image level at a time.

12. The method of claim 11, wherein the image is a grayscale image comprising multiple gray levels and filters initially are applied to a middle gray level of the image.

13. The method of claim 12, wherein filters initially are applied to a 50% gray level of the image.

14. The method of claim 12, wherein filters are applied to a different gray level of the image to resolve uncertainties or ambiguities, or both.

15. The method of claim 1, wherein the ordered sequence of halftone modulations is identifiable without knowledge of an original image corresponding to the image before halftone modulation.

16. A system for detecting information embedded in image, comprising:
   a decoder configured to apply a respective filter to the image to identify an ordered sequence of two or more different halftone modulations embedded in the image for each of the halftone modulations.

17. The system of claim 16, wherein each halftone modulation corresponds to a respective dither matrix and each filter corresponds to a matched filter for a respective dither matrix.

18. The system of claim 16, wherein the image comprises a plurality of image levels and the decoder is configured to apply filters to a single image level at time.

19. The system of claim 18, wherein the decoder is configure to apply filters to a different gray level of the image to resolve uncertainties or ambiguities, or both.

20. A computer program for detecting information embedded in an image, the computer program residing on a computer-readable medium and comprising computer-readable instructions for causing a computer to:
   for each of two or more different halftone modulations, applying a respective filter to the image to identify an ordered sequence of halftone modulations embedded in the image.

21. The computer program of claim 20, wherein the computer-readable instructions are configured to cause the computer to convolve the filter with the image.

22. The computer program of claim 21, further comprising computer-readable instructions configured to cause the computer to generate a score map for each halftone modulation based upon the convolution of the corresponding filter and the image.

23. The computer program of claim 22, further comprising computer-readable instructions configured to cause the computer to identify halftone modulations embedded in regions of the image based upon the generated score maps.

24. The computer program of claim 23, further comprising computer-readable instructions configured to cause the computer to select one halftone modulation as corresponding to an image region to which multiple halftone modulations are identified based upon the generated score maps.

25. The computer program of claim 23, wherein the computer-readable instructions are configured to cause the computer to identify halftone modulations in the image based upon a threshold applied to the score maps.

26. The computer program of claim 25, further comprising computer-readable instructions configured to cause the computer to lower the threshold in regions to which no halftone modulation has been identified based upon the first threshold.

27. The computer program of claim 20, further comprising computer-readable instructions configured to cause the computer to re-map image tone before halftoning.

28. The computer program of claim 20, wherein the image comprises a plurality of image levels, and filters are applied to a single image level at a time.

29. The computer program of claim 28, wherein the image is a grayscale image comprising multiple gray levels and filters initially are applied to a middle gray level of the image.

30. The computer program of claim 29, wherein the computer-readable instructions are configured to cause the computer to initially apply filters to a 50% gray level of the image.

31. The computer program of claim 29, wherein the computer-readable instructions are configured to cause the computer to apply filters to a different gray level of the image to resolve uncertainties or ambiguities, or both.

* * * * *